(12) United States Patent
Bowers

(10) Patent No.: US 6,394,029 B1
(45) Date of Patent: May 28, 2002

(54) TEAT SPRAY UNIT FOR A ROTARY MILKING PLATFORM

(76) Inventor: John Murray Bowers, 54 Thames St., Napier (NZ)

(*) Notice: Subject to any disclaimer, the term of this patent is extended or adjusted under 35 U.S.C. 154(b) by 0 days.

(21) Appl. No.: 09/632,731

(22) Filed: Aug. 4, 2000

(30) Foreign Application Priority Data

Feb. 7, 2000 (NZ) .............................................. 502723

(51) Int. Cl.[7] ................................................. A01J 5/00
(52) U.S. Cl. .................................................. 119/14.18
(58) Field of Search ...................... 119/14.01, 14.02, 119/14.03, 14.08, 14.1, 14.18

(56) References Cited

U.S. PATENT DOCUMENTS

| | | | | |
|---|---|---|---|---|
| 3,934,551 A | * | 1/1976 | Sulzberber | 119/14.04 |
| 4,145,992 A | * | 3/1979 | Rafaely | 119/14.04 |
| 6,050,219 A | * | 4/2000 | Van der Lely | 119/14.08 |
| 6,105,536 A | * | 8/2000 | Dewaard | 119/14.04 |

* cited by examiner

Primary Examiner—Thomas Price
(74) Attorney, Agent, or Firm—Greer, Burns & Crain, LTD

(57) ABSTRACT

Apparatus for spraying the teats of animals rotating on a milking platform. During a spray cycle: a spray head located below the platform is actuable to spray each animal; the spray head completes one horizontal reciprocating movement, being driven forward by engagement with the platform and driven backward by a counterweight raised during the forward movement; the spray head is also raised and then lowered through an opening in the platform, this vertical movement actuated by a cam follower associated with the horizontal movement. Elements are provided for aligning the spray head with the opening, engaging and disengaging with a plurality of pin members on the platform.

21 Claims, 6 Drawing Sheets

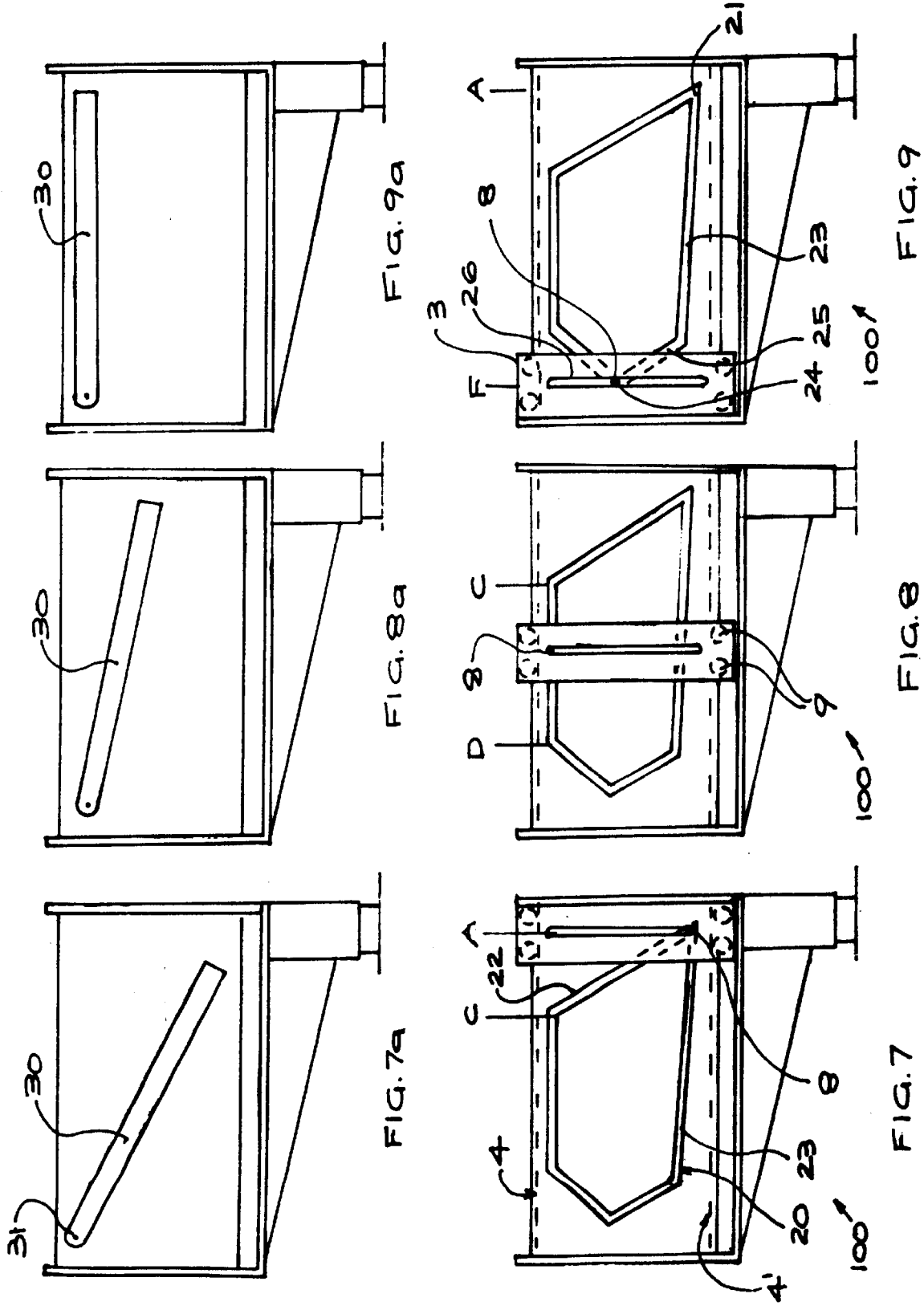

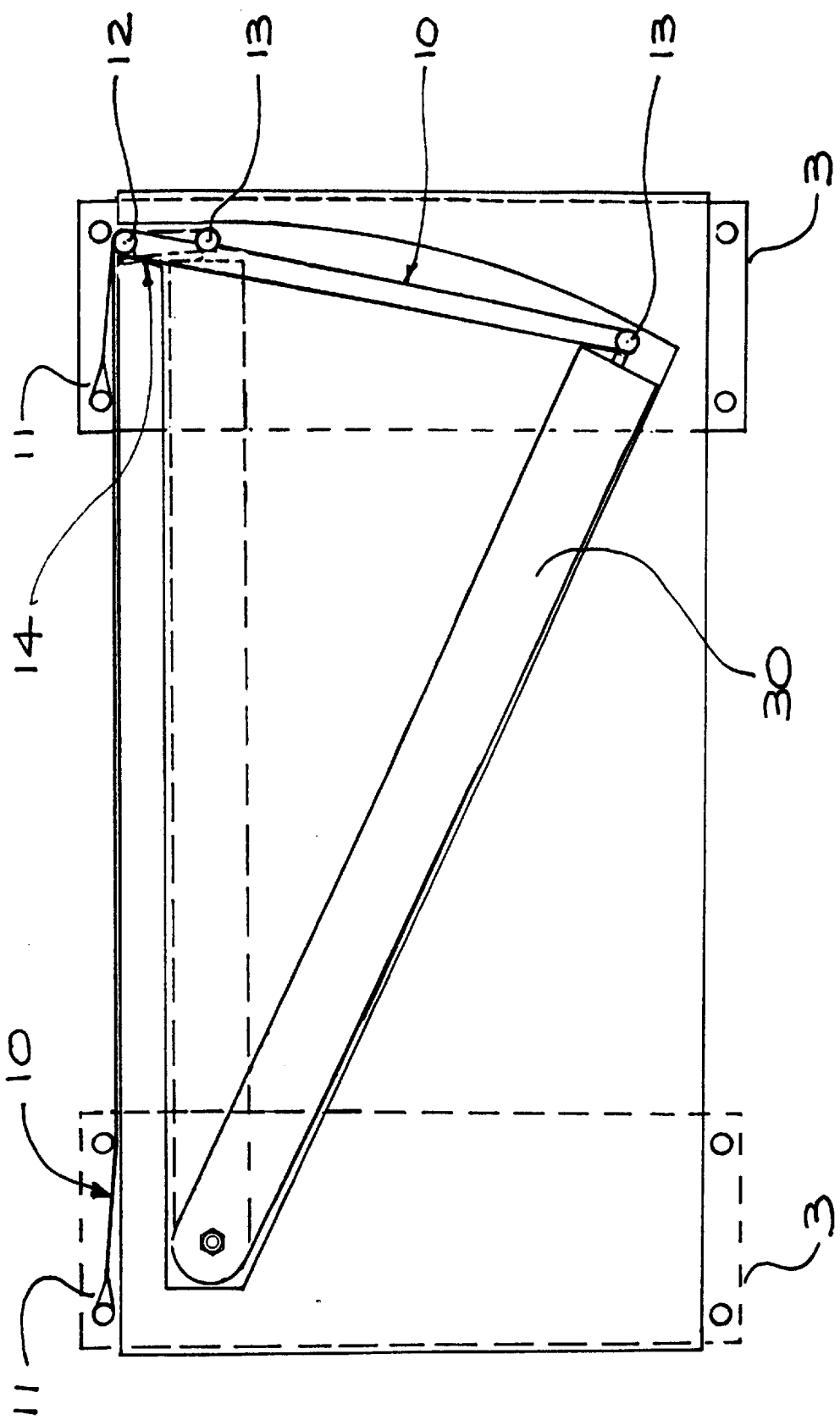

TEAT SPRAY UNIT FOR A ROTARY MILKING PLATFORM

TECHNICAL FIELD

The present invention relates to a teat spray apparatus for a rotary milking platform, more particularly to a spray apparatus capable of applying a spray at each milking station on the platform.

BACKGROUND ART

In using a rotary milking platform dairy animals are first admitted one animal at a time to individual milking stations on the rotating annular platform. Before applying the cups of the milker, the teats are sprayed with an anti-bacterial treatment. A different post-milking protective treatment is also applied before the animal leaves the platform after a complete revolution or milking cycle.

In the past, spraying of animal teats has been done manually. This typically requires additional staff to those attaching and taking off the milking cups and thus increases the cost of the operation.

One method of automating this spraying employs an electronically controlled spray apparatus which the animal walks over. The animals are restrained into single file and sensors control the activation of the spray. Such a system, however, is only suited to a post-milking treatment, since such an initial spray application may only be made immediately before fitting the cups to the teats, otherwise there is the chance that the teats will be fouled again. In addition, the sensors and electronics are exposed to the harsh environment of the milking shed, require regular cleaning and are vulnerable to reliability problems. Sensors which may be used with such spray apparatus are also very expensive since they must be rugged and durable to be reliable, as they are subject to continual dampness and a corrosive atmosphere. They must also be highly resistant to electrical leakage which may injure or disturb the animals, must be highly resistant to the ingress of foreign matter, and must meet strict sanitary requirements.

Another method of automating the spraying employs a spray apparatus at each station of the platform. A disadvantage of this arrangement is the necessary complication and expense of the extensive pipework and valving required. Furthermore, since the spraying stations are on the rotating platform, the spray used has to be mounted on the platform and a rotating connection for electricity is required.

It is an object of the present invention to provide a spray apparatus for applying a spray to each animal in turn as the animal passes the spray apparatus on a rotary milking platform.

It is another object of the present invention to provide a spray system for use with a rotary milking platform including two or more spray apparatus, a first apparatus for providing a pre-milking treatment and a second apparatus for providing a post-milking treatment.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a teat spray apparatus for a rotary milking platform, the platform having means for locating dairy animals at a plurality of milking stations thereon and an opening in the floor of each milking station wherein a spray cycle is performed as the platform rotates and wherein the spray apparatus includes:

- a spray means located underneath the platform for performing the said spray cycle for each station on the platform, during which spray cycle a fluid spray is produced above the opening; and
- means for aligning the spray means with the opening during at least part of the spray cycle.

According to another aspect of the present invention there is provided a teat spray apparatus substantially as described above wherein the spray apparatus is located under the platform.

According to another aspect of the present invention there is provided a teat spray apparatus substantially as described above wherein the spray means includes a spray head for producing the fluid spray characterised in that the spray head is fixed to a reciprocating means.

According to another aspect of the present invention there is provided a teat spray apparatus substantially as described above wherein the reciprocating means includes a carriage running on a generally horizontal track, the carriage being driven forward by engagement with the platform and being driven backward by an action involving the release of energy from an energy storage means associated with the carriage, wherein the energy storage means is charged during the preceding forward movement.

According to another aspect of the present invention there is provided a teat spray apparatus substantially as described above wherein the track is linear and is freely pivoted about a substantially vertical axis, thereby allowing the apparatus to accommodate platforms where the radial position of the opening varies.

According to another aspect of the present invention there is provided a teat spray apparatus substantially as described above wherein prior to commencing spraying, the spray head of the spray means is raised at least part way through the opening, and after spraying is completed the spray head is retracted below the opening.

According to another aspect of the present invention there is provided a teat spray apparatus substantially as described above, wherein the energy storage means includes a counter weight which is raised during the forward movement, and drives the carriage during the backward movement.

According to another aspect of the present invention there is provided a teat spray apparatus substantially as described above wherein the spray head is fixed to a cam follower device, the cam follower being constrained to follow a first path during the forward movement and the cam follower being constrained to follow a second path during the backward movement, whereby a vertical component of the movement of the cam follower controls the movement of the spray head along the substantially vertical axis relative to the carriage.

According to another aspect of the present invention there is provided a teat spray apparatus substantially as described above wherein the means of aligning the opening with the spray head also provides the means by which the carriage is engaged with the platform, the means including:

- a first rigid engagement part fixed to the platform adjacent to each opening;
- a second resilient engagement part fixed to the carriage, wherein the engagement between a first part and the second part is by direct contact, driving the carriage in a direction which has components both parallel and perpendicular to a longitudinal axis of the track, and wherein during the first movement the resilience of the second part reduces the acceleration of the carriage when contact is first made between the first part and the second part.

According to another aspect of the present invention there is provided a teat spray apparatus substantially as described above wherein the resilient second part is deflected sufficiently at the end of the each forward movement to disengage from the first member.

Preferably, a rotary milking platform will be provided with two apparatus, a first providing a pre-milking treatment at a position near the entry to the platform and a second providing a post-milking treatment at a position near the exit to the platform.

Preferably, the animal milked on the platform is selected from cows and sheep. Preferably the platform is totally elevated and made substantially of concrete, and the cows face inward at the stations.

According to another aspect of the present invention there is provided a method of spraying the teats of a dairy animal including the steps of:

positioning the said animal at a milking station on a rotating platform;

providing a teat spray apparatus as claimed in any one of claims 1 to 13; and actuating the said spray means while the platform rotates.

BRIEF DESCRIPTION OF DRAWINGS

Further aspects of the present invention will become apparent from the following description which is given by way of example only, with reference to an elevated platform and with reference to the accompanying drawings in which:

FIG. 7 is an elevation of a carriage and a track of a apparatus of the present invention, in an initial position;

FIG. 7a is an elevation of a counter weight in a position corresponding to that of the carriage in FIG. 7;

FIG. 8 is an elevation of a carriage and a track of a apparatus during a part of its operation subsequent to that in FIG. 7;

FIG. 8a is an elevation of a counter weight in a position corresponding to that of the carriage in FIG. 8;

FIG. 9 is an elevation of a carriage and a track of a apparatus during a part of its operation subsequent to that in FIG. 8;

FIG. 9a is an elevation of a counter weight in a position corresponding to that of the carriage in FIG. 9;

FIG. 10 is an elevation showing the operation of a counter weight attached to a carriage, according to the present invention;

BEST MODES FOR CARRYING OUT THE INVENTION

Referring to FIGS. 1 to 4, the operation of the spray apparatus 100 of the present invention is illustrated schematically therein. A rotating annular milking platform 1, includes an opening 2 therethrough. Each opening 2 is positioned on the outer half of the platform 1 with respect to an annular centre line (not shown) of the platform 1 in plan.

A teat spray is provided through the opening for a period of time during the rotation of the platform 1. For the purposes of explaining the invention, it will be assumed that the platform 1 rotates at a constant angular velocity in a clockwise direction, however it will be appreciated that the present invention may also be used when the angular velocity is non-constant, and/or when the rotation is in the opposite direction.

Figure 3:
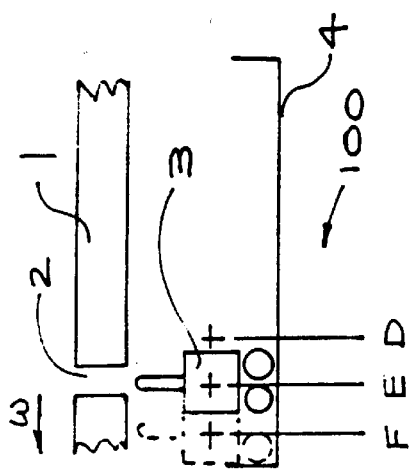
FIG. 3 is a schematic illustrating the operation of the spray apparatus during a part of its operating cycle subsequent to that in FIG. 2.
Figure 4:
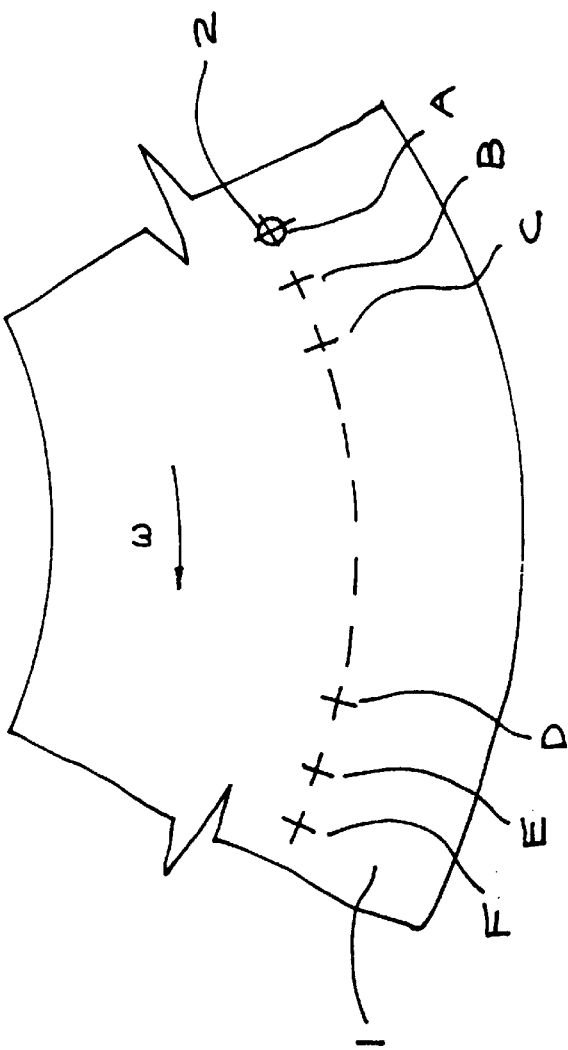
FIG. 4 is a plan view illustrating the path of an opening in a rotating platform.
Figure 2:
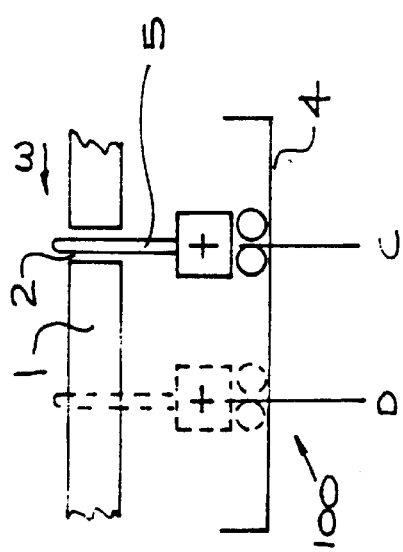
FIG. 2 is a schematic illustrating the operation of the spray apparatus during a part of its operating cycle subsequent to that in FIG. 1.
Figure 1:
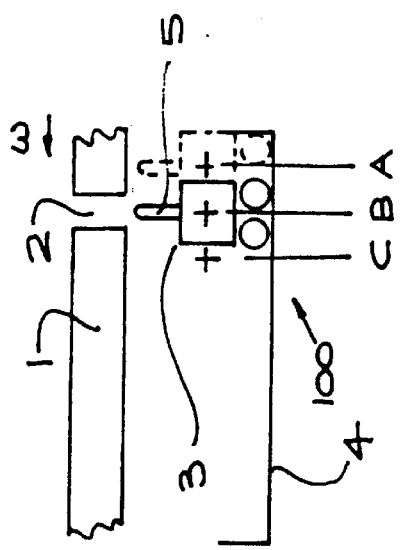
FIG. 1 is a schematic illustrating the operation of the spray apparatus of the present invention during a first part of its operating cycle.

The platform 1 rotates clockwise in direction W when viewed from above (FIG. 4) or from right to left as seen in the sectional views FIGS. 1–3. A carriage 3 runs on a track 4 generally between points A–F. The carriage 3 includes an extendible spray head 5, and means of actuating the spray head 5.

Starting at point A (FIG. 1) the speed of the carriage 3 is initially zero, and the spray head 5 is retracted. Between the points A and B the carriage 3 accelerates, moving in the direction W, so that at the point B the carriage 3 is moving at the same velocity as the opening 2 and the spray head 5 is aligned with the opening 2. This alignment between the opening 2 and the spray head 5 is maintained until point E. Between the points B and C the spray head 5 extends through the opening 2, reaching full extension and commencing the spray cycle at point C (FIG. 2). The spray cycle continues until the carriage 3 reaches point D, at which point the spraying stops. Between the points D and E the spray head 5 retracts through the opening 2 (FIG. 3). At point E, the carriage 3 starts to decelerate, reaching zero velocity at point F, after which (not shown) it returns to point A before repeating the above cycle.

The spacings of the points A–F (FIGS. 1 to 4) are illustrative only, and are representative of the time taken by the carriage when travelling between the points A–F. This may vary from fractions of a second to several seconds for the actual spray cycle. It will be appreciated that the phasing of the movement of the spray head 5 relative to the carriage 3 may be varied, such variations being within the scope of the present invention.

In practice it has been found that for a platform with 80 milking stations, and a speed of rotation of the platform 1 of six minutes, a spray cycle lasting 1.5 seconds is optimal.

It will be appreciated by those skilled in the art that the distance the carriage 3 travels will depend on: the capacity of the platform 1; the speed of rotation of the platform 1 (which may not always be a direct function of the capacity of the platform 1); and other factors, for example the desired or required minimum spray time.

Figure 6:
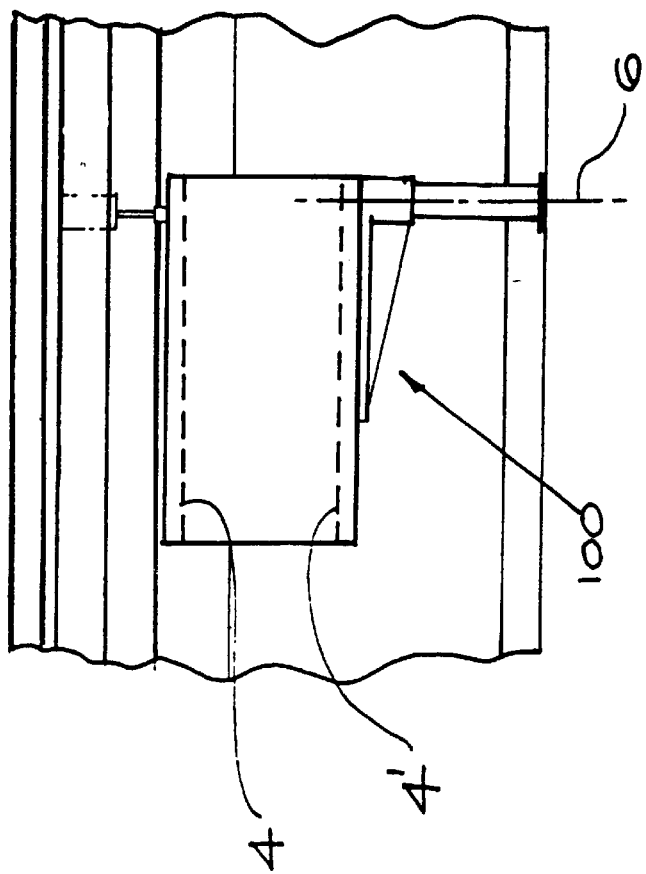
FIG. 6 is a second elevation of a spray apparatus of the present invention.
Figure 5:
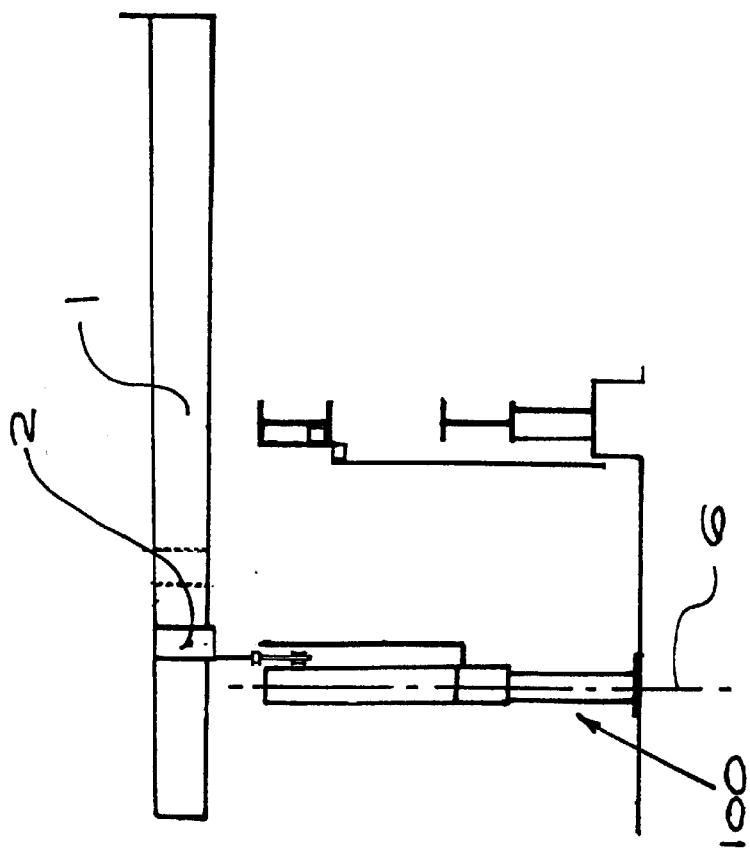
FIG. 5 is an elevation of a spray apparatus of the present invention.

FIGS. 5 and 6 illustrate the preferred embodiment of the present invention wherein the tracks 4, 4' are generally horizontal and form part of an assembly 100 which is pivotally mounted about a substantially vertical axis 6. In this manner, movement in arcs of different radii may be achieved by a combination of linear movement along the horizontal tracks 4, 4' and rotation about the axis 6. It will be appreciated that platforms 1 where the radial position of the opening 2 varies may thus be accommodated. Further, the assembly 100 can 'track' with the rotational movement of the platform 1.

The preferred reciprocating horizontal motion of the carriage 3 and the extension/retraction cycle of the spray head 5 are illustrated in FIGS. 7 to 9, 7a to 9a. FIGS. 7a, 8a, 9a show the motion of a counter weight 30 in positions corresponding to the position of the apparatus 100 as shown in FIGS. 7, 8, 9 respectively.

The spray head 5 itself has been omitted from FIGS. 7–9 for clarity. However, the movement of the spray head 5 directly follows the movement of cam follower 8, to which the spray head 5 is fixed. The cam follower 8 is restrained within a generally vertically oriented slot 26.

Figure 11:
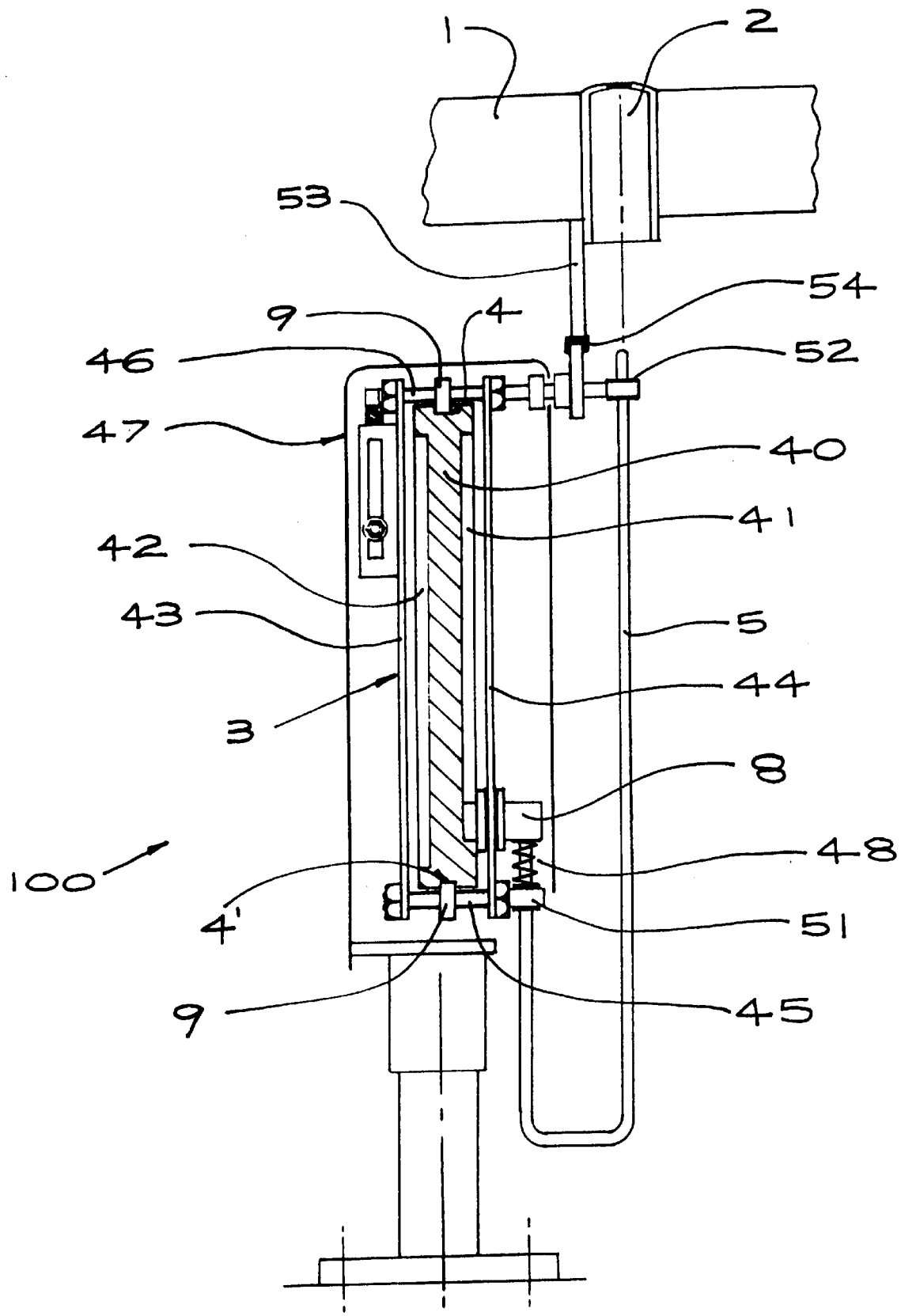
FIG. 11 is a vertical section through a spray apparatus of the present invention.

The carriage 3 runs on four rollers 9 (FIG. 11, showing only one of each of set of rollers 9), two each on a top track 4 and on a bottom track 4' respectively. The cam follower 8 follows a path generally depicted by the numeral 20. With the carriage 3 at position A, the cam follower 8 is at point 21 (FIG. 7) at the intersection of two tracks 22, 23 of a cam path 20. A spring 48 (see FIG. 11) biases the cam follower 8 upward to follow path 22 (FIG. 7).

As an opening 2 in the platform 1 passes, the carriage 3 engages with the platform 1 and moves in direction W. The engagement means by which this is performed is fully described with reference to FIGS. 11–13. As the carriage 3 is driven toward position C (FIG. 7), the cam follower 8 is raised and at the same time a counter weight 30, pivoted about an axis 31 (FIG. 7a), is also raised. During the spray cycle (FIG. 8) between points C and D the spray head 5 is fully extended, and continued movement of the carriage 3 in direction W further raises the counter weight 30 (FIG. 8a).

From the shape of the cam path 20, it may be seen that the cam follower 8 begins to drop from position D, in order that before reaching the end position F the spray head 5 is lowered below the platform 1. At position F (FIG. 9, 9a) the carriage 3 disengages from the platform 1 and the counter weight 30 is fully raised. At point 24 on the path 20 the cam follower 8 is biased downward by its own weight and the weight of the attached spray head 5 and under the action of the counter weight it moves along path 25, then path 23 to point 21 where it is ready to perform the same cycle, before the next opening 2 passes.

The operation of the counter weight 30 may be seen from FIG. 10, wherein the carriage 3 is shown at one end of its reciprocating motion. The counter weight 30 is shown at each end of its reciprocating motion. A flexible member 10, preferably a cord, connects the carriage 3 to the counter weight 30. A first end 11 of the cord 10 is fixed to the carriage 3. The cord 10 passes around a roller 12 which is fixed to the carriage 3. The cord 10 then loops around a roller 13, which is fixed to the counter weight 30. A second end 14 of the cord 10 is fixed adjacent to the roller 12. At all times the counter weight 30 acts to bias the carriage 3 towards position A.

With reference to FIG. 11, a cross-section through the assembly 100 is there shown. The top and bottom tracks 4, 4' are formed in a central block 40 with a side 41. The cam path 20 (FIG. 7), with the counter weight 30, is positioned on a second side 42. The carriage 3 includes frame members 43, 44 joined by connecting members 45, 46, which members also locate the four rollers 9. The spray head 5 is fixed to the cam follower 8 and supported in guides 51, 52 which restrain the spray head 5 laterally. The assembly 100 sits within an enclosure 47.

Figure 12:
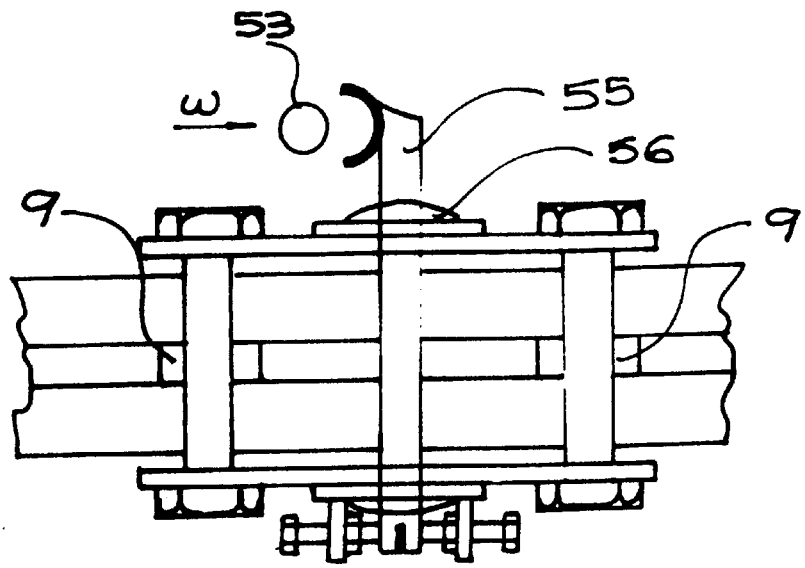
FIG. 12 is a horizontal section through a spray apparatus of the present invention.
Figure 13:
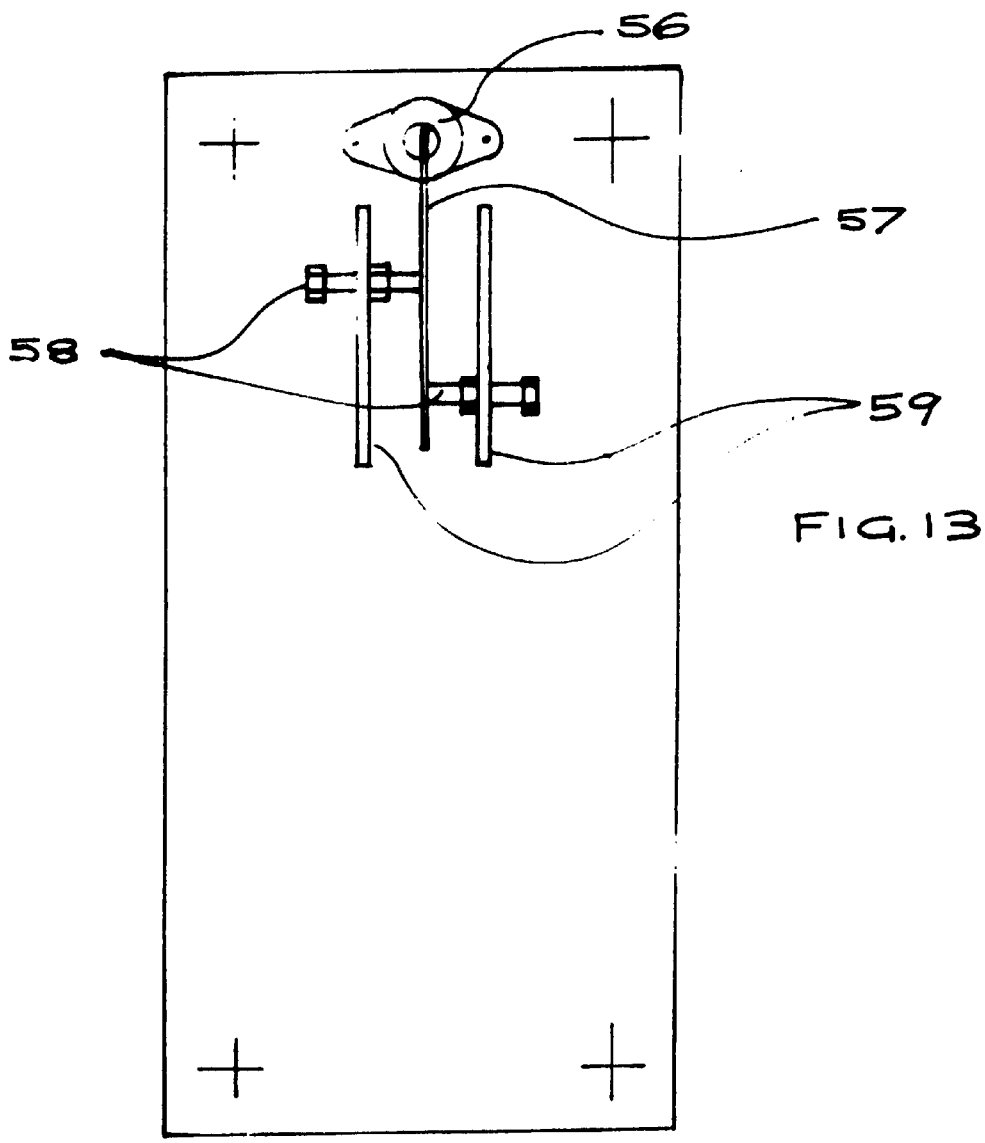
FIG. 13 is an elevation of one side of a carriage of a spray apparatus of the present invention.

The engagement means by which the carriage 3 engages with the platform 1 is illustrated in FIGS. 11–13. Adjacent to each opening 2 is a pin 53, which extends below the platform 1. The pin 53 engages with the carriage 3, drawing the carriage 3 along between positions A to F. The mechanism fixed to the carriage 3, which engages with the pin 53, includes a saddle 54 which is resiliently mounted. The saddle 54 is offset vertically from the axis of the shaft 55 to which the saddle 54 is fixed. The shaft 55 is supported in bearings 56 and restrained from rotating by a beam type spring element 57. The pre-load on the spring element 57 may be adjusted by the adjusting bolts 58 fixed to the slotted plates 59. The saddle-type engagement (a saddle 54) with the pin 53 allows the assembly 100 to rotate about the axis 6 due to the component of the movement of the pin 53. This component is perpendicular to the axis of the tracks 4,5. The resilience of the engagement means reduces the impact of what would otherwise be a sharp impact as the pin 53 strikes the stationary saddle 54 at point A. At point F, the resilience of the engagement means enables the saddle 54 to deflect sufficiently that it disengages from the pin 53.

The main structural components of the spray apparatus 100 are of steel, preferably of stainless steel construction for long life and easy cleaning in the harsh environment of a milking shed, where none-the-less is vital. The block 40 and rollers 9 are of plastic, preferably nylon.

Whilst a reciprocating mechanism has been described above, it will be appreciated by those skilled in the art that many other types of intermittent movement drives could be used. For example, pneumatic or hydraulic rams which actuate the various movements of the apparatus 100, or a series of actuable drive wheels or the like could be used.

Aspects of the present invention have been described by way of example only and it should be appreciated that modifications and additions may be made thereto without departing from the scope thereof.

What is claimed is:

1. A teat spray apparatus for performing a spray cycle for a rotary milking platform, the platform having means for locating dairy animals at a plurality of milking stations thereon and an opening in the floor of each milking station wherein the said spray cycle is performed as the platform rotates and wherein the improvement comprises:

a spray head located underneath the platform actuable to produce a fluid spray above each said opening; and means for aligning the said spray head with the opening during at least part of the said spray cycle.

2. A teat spray apparatus as claimed in claim 1 wherein the spray head reciprocates in a substantially horizontal plane.

3. A teat spray apparatus as claimed in claim 2 wherein the spray head is raised at least part way through the said opening and is then retracted below the opening.

4. A teat spray apparatus as claimed in claim 3 wherein during a forward movement in the said horizontal plane the spray head is driven by engagement with the said rotating platform and energy is stored in an energy storage means, and wherein during a backward movement in the said horizontal plane the spray head is driven by an action involving the release of energy from the said energy storage means.

5. A teat spray apparatus as claimed in claim 4 wherein the said apparatus is mounted underneath the platform.

6. A teat spray apparatus as claimed in claim 5 wherein said apparatus further comprises a horizontally reciprocating carriage to which the said spray head is fixed, the carriage running on a track and the carriage being connected to the said energy storage means.

7. A teat spray apparatus as claimed in claim 6 wherein the said track is linear and is freely pivoted about a substantially vertical axis.

8. A teat spray apparatus as claimed in either claim 7 wherein the said energy storage means includes a counterweight which is raised during the said forward movement, and drives the carriage during the said backward movement.

9. A teat spray apparatus as claimed in claim 4 wherein the said spray head is fixed to a cam follower device, the cam follower being constrained to follow a first path during the said forward movement and the cam follower being constrained to follow a second path during the said backward movement, whereby a vertical component of the movement of the cam follower controls the movement of the spray head along the said substantially vertical axis relative to the carriage.

10. A teat spray apparatus as claimed in claim 2 wherein during a forward movement in the said horizontal plane the spray head is driven by engagement with the said rotating platform and energy is stored in an energy storage means, and wherein during a backward movement in the said horizontal plane the spray head is driven by an action involving the release of energy from the said energy storage means.

11. A teat spray apparatus as claimed in claim 10 wherein the said apparatus is mounted beneath the platform.

12. A teat spray apparatus as claimed in claim 11 wherein said apparatus further comprises a horizontally reciprocating carriage to which the said spray head is fixed, the carriage running on a track and the carriage being connected to the said energy storage means.

13. A teat spray apparatus as claimed in claim 12 wherein the said track is linear and is freely pivoted about a substantially vertical axis.

14. A teat spray apparatus as claimed in claim 13 wherein the means of aligning the said opening with the spray head also provides the means by which the carriage is engaged with the platform, said means including:

a first rigid engagement part fixed to the platform adjacent to each opening;

a second resilient engagement part fixed to the carriage, wherein the engagement between a first part and the second part is by direct contact, driving the carriage in a direction which has components both parallel and perpendicular to a longitudinal axis of the said track, and wherein during the said first movement the resilience of the second part reduces the acceleration of the carriage when contact is first made between the first part and the second part.

15. A teat spray apparatus as claimed in claim 14 wherein the resilient second part is deflected sufficiently at the end of the each forward movement to disengages from the said first part.

16. A method of spraying teats of a dairy animal including the steps of:

positioning the said animal at a milking station on a rotating platform;

providing a teat spray apparatus as claimed in claim 15; and actuating the said spray head to produce a fluid spray while the platform rotates.

17. A teat spray apparatus as claimed in claim 12 wherein the said energy storage means comprises a counterweight which is raised during the said forward movement, and drives the carriage during the said backward movement.

18. A teat spray apparatus as claimed in claim 1 wherein the teat spray apparatus provides a pre-milking spray treatment at a position near the animal's entry to the said platform.

19. A teat spray apparatus as claimed in claim 1 wherein the teat spray apparatus provides a post-milking spray treatment at a position near the animal's exit to the platform.

20. A teat spray apparatus as claimed in claim 1 wherein the platform is elevated and made from concrete, wherein the animals are cows and each station is inward facing.

21. A method of spraying teats of a dairy animal including the steps of:

positioning the said animal at a milking station on a rotating platform;

providing a teat spray apparatus as claimed in claim 1; and actuating the said spray head to produce a fluid spray while the platform rotates.

* * * * *